(12) United States Patent
Inoue

(10) Patent No.: US 12,401,906 B2
(45) Date of Patent: Aug. 26, 2025

(54) INTERCHANGEABLE LENS AND IMAGE PICKUP APPARATUS

(71) Applicant: CANON KABUSHIKI KAISHA, Tokyo (JP)

(72) Inventor: Hajime Inoue, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/939,595

(22) Filed: Sep. 7, 2022

(65) Prior Publication Data
US 2023/0077645 A1  Mar. 16, 2023

(30) Foreign Application Priority Data

Sep. 14, 2021  (JP) ................................ 2021-149728

(51) Int. Cl.
| | |
|---|---|
| H04N 23/71 | (2023.01) |
| G03B 17/14 | (2021.01) |
| H04N 13/218 | (2018.01) |
| H04N 13/286 | (2018.01) |
| H04N 13/296 | (2018.01) |
| H04N 23/72 | (2023.01) |

(52) U.S. Cl.
CPC ............. *H04N 23/71* (2023.01); *G03B 17/14* (2013.01); *H04N 13/218* (2018.05); *H04N 13/286* (2018.05); *H04N 13/296* (2018.05); *H04N 23/72* (2023.01)

(58) Field of Classification Search
CPC ...... H04N 23/71; H04N 23/72; H04N 13/296; H04N 13/286; H04N 13/218; G03B 17/14
USPC ............................................................. 348/49
See application file for complete search history.

(56) References Cited

U.S. PATENT DOCUMENTS

| | | | | |
|---|---|---|---|---|
| 2008/0106634 | A1* | 5/2008 | Masuda | H04N 23/73 348/E5.034 |
| 2011/0280564 | A1* | 11/2011 | Ikeda | H04N 13/189 396/324 |
| 2012/0147148 | A1* | 6/2012 | Kusaka | H04N 23/6812 348/340 |
| 2012/0162383 | A1* | 6/2012 | Kushida | H04N 5/208 348/47 |
| 2013/0170029 | A1* | 7/2013 | Morita | G03B 17/565 359/464 |
| 2014/0002612 | A1* | 1/2014 | Morioka | H04N 13/133 348/46 |

(Continued)

FOREIGN PATENT DOCUMENTS

| | | |
|---|---|---|
| JP | 2001222083 A | 8/2001 |
| JP | 2011247965 A | 12/2011 |

(Continued)

*Primary Examiner* — Joseph G Ustaris
*Assistant Examiner* — Jimmy S Lee
(74) *Attorney, Agent, or Firm* — ROSSI, KIMMS & McDOWELL LLP

(57) ABSTRACT

An interchangeable lens attachable to and detachable from an image pickup apparatus that includes a single image sensor includes a plurality of lens units that include a first lens unit and a second lens unit, and a communication unit configured to transmit to the image pickup apparatus information for setting an imaging area acquired by the first lens unit that is used in monaurally displaying image to a photometric area.

6 Claims, 7 Drawing Sheets

(56) References Cited

U.S. PATENT DOCUMENTS

2014/0168387 A1\* 6/2014 Aoki .................... H04N 13/207
348/49

FOREIGN PATENT DOCUMENTS

JP 2012137749 A 7/2012
WO 2012017684 A1 2/2012

\* cited by examiner

INTERCHANGEABLE LENS AND IMAGE PICKUP APPARATUS

BACKGROUND

Technical Field

The disclosure relates to an interchangeable lens that includes a plurality of lens units.

Description of the Related Art

One conventionally known method of imaging a stereoscopic image is an imaging method using a compound eye lens unit configured to acquire a plurality of images having different viewpoints and attached to a monocular camera body. The camera body performs auto exposure adjustment (AE) using an area at or near the center of the captured image as a photometric area, but cannot accurately perform AE in a case where the compound eye lens unit is attached because the center of each of the left and right images is different from the center of the image captured in a case where a monocular lens is attached. Japanese Patent Laid-Open No. ("JP") 2001-222083 discloses a configuration in which the photometric area in the case where the compound eye lens unit is attached is different from that in the case where the monocular lens is attached. In addition, the configuration disclosed in JP 2001-222083 performs photometry near the center of either the left image or the right image, because photometry performed near the center of each of the left and right images causes the subsequent processing and the like to be complicated.

However, the configuration disclosed in JP 2001-222083 does not previously determine which of the left and right image areas should be used as the photometric area and thus causes the following problem. In a case where the camera body mounted with the compound eye lens unit that supports VR 180, which is a stereoscopic VR moving-image standard at an angle of view of 180 degrees, monaurally displays a stereoscopic image, the camera body is specified to display a left-eye image as a reference image. Here, the monaural display is a non-stereoscopic image display, such as thumbnails in a reproduction on a head mount display (HMD). If there is a difference between the exposure of the right-eye image and the exposure of the left-eye image for some reason, setting the right-eye image to the photometric area may reduce the AE accuracy of the reference image.

SUMMARY

The disclosure provides an interchangeable lens that can make proper (or adjust) exposure of a reference image to be displayed in a case where a stereoscopic image is monaurally displayed.

An interchangeable lens according to one aspect of the disclosure attachable to and detachable from an image pickup apparatus that includes a single image sensor includes a plurality of lens units that include a first lens unit and a second lens unit, and a communication unit configured to transmit to the image pickup apparatus information for setting an imaging area acquired by the first lens unit that is used in monaurally displaying an image to a photometric area.

An interchangeable lens according to another aspect of the disclosure attachable to and detachable from an image pickup apparatus that includes a single image sensor includes a plurality of lens units that include a first lens unit and a second lens unit, and a communication unit configured to select one lens unit from among the plurality of lens units based on an orientation of the interchangeable lens, and to transmit to the image pickup apparatus information for setting an imaging area acquired by the one lens unit to a photometric area.

An image pickup apparatus according to another aspect of the disclosure to which an interchangeable lens including a plurality of lens units is detachably attached, the plurality of lens units including a first lens unit and a second lens unit, includes a single image sensor, and a setting unit configured to acquire from the interchangeable lens information for setting an imaging area acquired by the first lens unit that is used in monaurally displaying an image to a photometric area.

Further features of the disclosure will become apparent from the following description of exemplary embodiments with reference to the attached drawings.

DESCRIPTION OF THE EMBODIMENTS

Figure 1:
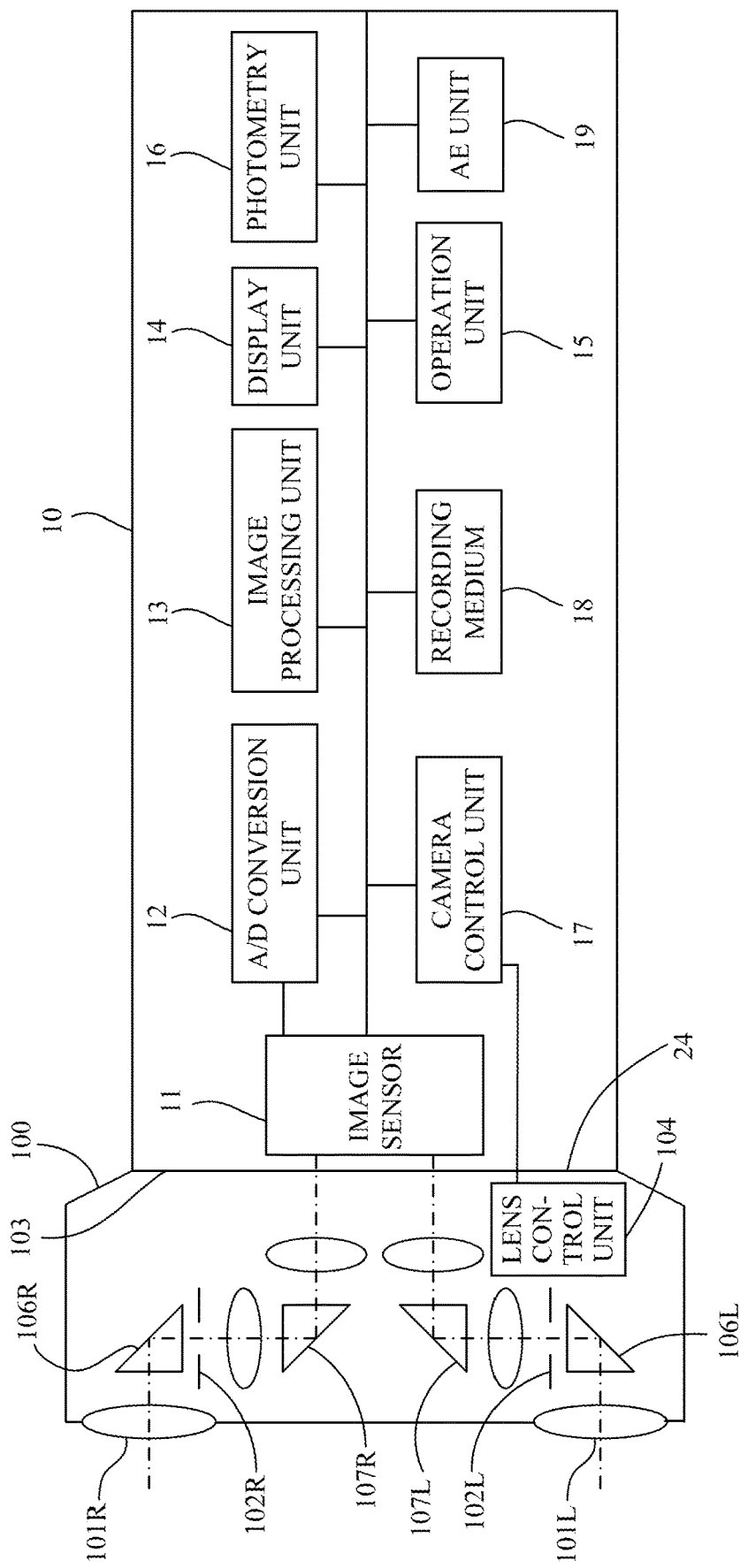
FIG. 1 is a configuration diagram of a camera system according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 is a configuration diagram of a camera system according to one embodiment of the disclosure. The camera system includes an interchangeable lens 100 and a camera (image pickup apparatus) 10. The interchangeable lens 100 is a compound eye lens unit and is attachable to and detachable from the camera 10.

The camera 10 and the interchangeable lens 100 each include a camera mount 24 and a lens mount 103 including electrical contacts for supplying power to the interchangeable lens 100 from the camera 10 and for communicating with each other.

The interchangeable lens 100 includes a plurality of lens units including a right-eye lens unit (second lens unit) and a left-eye lens unit (first lens unit) disposed so as not to overlap each other in their optical axis directions. Each of the plurality of lens units is an imaging optical system configured to form an optical image of an object. The interchangeable lens 100 includes aperture (diaphragm) units 102R and 102L and an aperture driving unit 105 that drives an actuator that operates the aperture units 102R and 102L. Each aperture unit changes the luminance of an image acquired by a corresponding one of the lens units. The interchangeable lens 100 includes prisms 106R, 107R, 106L, and 107L that deflect the optical axis by 90 degrees by reflections. The interchangeable lens 100 includes a lens control unit (communication unit) 104 that includes a microcomputer that controls the aperture stops according to a control signal received by communication from a camera control unit (setting unit) 17 in the camera 10. In this embodiment, a plurality of lens units are two lens units, but the number of lens units is not limited to two.

The camera 10 includes an image sensor 11 that photo-electrically converts an object image formed by a right-eye lens unit 101R and a left-eye lens unit 101L and outputs an electric signal. The camera 10 includes an analog-to-digital (A/D) conversion unit 12 that converts an analog electric signal output from the image sensor 11 into a digital signal, and an image processing unit 13 that performs various image processing for the digital signal to generate an image. The image generated by the image processing unit 13 is displayed on a display unit 14 and recorded in a recording medium 18. The camera 10 includes an operation unit 15 that includes a power switch for turning on and off the power, an imaging (release) switch for starting image recording, a selection/setting switch for setting a stereoscopic display, a monaural display, an auto exposure adjustment (AE) (including an aperture priority mode, a shutter speed priority mode, a program mode, etc.), an imaging mode that automatically changes exposure, and various menus, and the like. The camera control unit 17 includes a microcomputer, and controls the image processing unit 13 and communication with the interchangeable lens 100 according to a signal from the operation unit 15. The camera 10 further includes a photometry unit 16 that measures the luminance of an object (performs photometry) in a photometric area set by the camera control unit 17 using an unillustrated photometric sensor, and an AE unit 19 that automatically adjusts the exposure based on the photometry result of the photometry unit 16. The display unit 14 may display the photometry result by the photometry unit 16. The display unit 14 can monaurally display images captured by the plurality of lens units.

Figure 2:
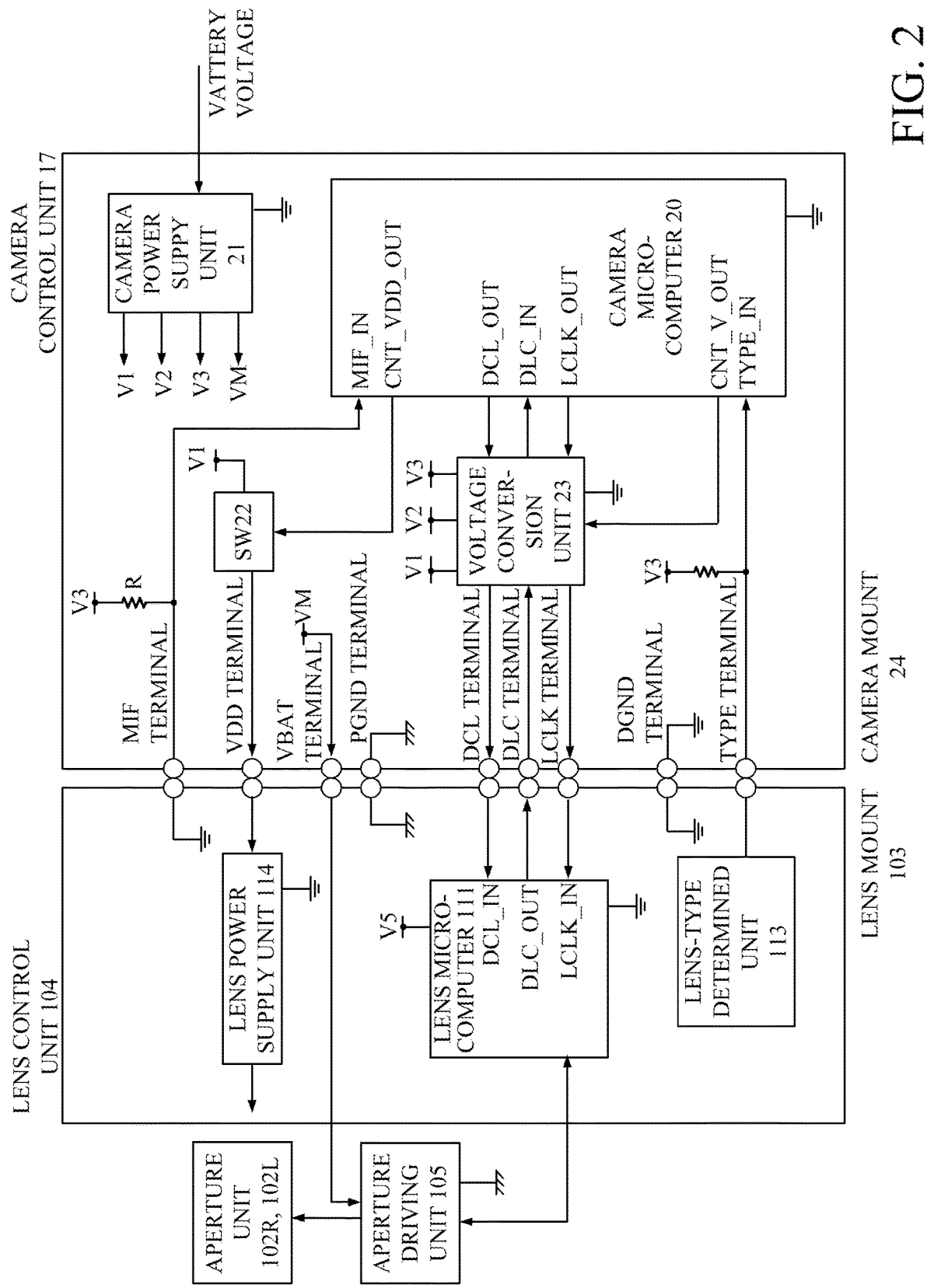
FIG. 2 illustrates a configuration of a camera control unit and a lens control unit.

FIG. 2 illustrates configurations of the camera control unit 17 and the lens control unit 104. FIG. 2 illustrates terminals included in the camera mount 24 and the lens mount 103 for electrical connections.

Each LCLK terminal is a terminal for a communication clock signal output from the camera 10 to the interchangeable lens 100. Each DCL terminal is a terminal for communication data output from the camera 10 to the interchangeable lens 100. Each DLC terminal is a terminal for communication data output from the interchangeable lens 100 to the camera 10.

Each MIF terminal is a terminal for detecting an attachment of the interchangeable lens 100 to the camera 10. A microcomputer (referred to as a camera microcomputer hereinafter) 20 in the camera control unit 17 detects an attachment of the interchangeable lens 100 to the camera 10 based on the voltage of the MIF terminal.

Each TYPE terminal is a terminal for detecting a type of the interchangeable lens 100 attached to the camera 10. The camera microcomputer 20 detects the type of the interchangeable lens 100 attached to the camera 10 based on the voltage of the TYPE terminal.

Each VBAT terminal is a terminal for supplying a driving power source from the camera 10 to the interchangeable lens 100 for various operations other than communication control. Each VDD terminal is a terminal for supplying a communication control power source for communication control from the camera 10 to the interchangeable lens 100. Each DGND terminal is a terminal for grounding communication control systems of the camera 10 and the interchangeable lens 100. Each PGND terminal is a terminal for grounding mechanical driving systems including a motor and the like of the camera 10 and the interchangeable lens 100.

A plurality of types of interchangeable lenses 100 having different communication voltages with the camera 10 are selectively attached to the camera 10. In the following description, the types of the interchangeable lens 100 that the camera 10 identifies based on the voltage of the TYPE terminal include a first interchangeable lens and a second interchangeable lens having a communication voltage different from that of the first interchangeable lens.

A camera power supply unit 21 in the camera control unit 17 converts the battery voltage supplied from an unillustrated battery mounted on the camera 10 into a voltage necessary for the operation of each circuit. At this time, the camera power supply unit 21 generates a first voltage V1, a second voltage V2, a third voltage V3, and a power supply voltage VM.

The first voltage V1 is a power supply voltage as a communication control power source for the first and second interchangeable lenses, and is also a communication voltage for the first interchangeable lens. The second voltage V2 is the communication voltage of the second interchangeable lens. The third voltage V3 is a power supply voltage as an operating power source for the camera microcomputer 20. The power supply voltage VM is a power supply voltage as a driving power source for the first and second interchangeable lenses.

When the power switch 22 is turned on, the camera microcomputer 20 starts supplying the communication control power supply and the driving power supply to the interchangeable lens 100. When the power switch 22 is turned off, the camera microcomputer 20 stops supplying the communication control power supply and the driving power supply to the interchangeable lens 100.

The camera microcomputer 20 communicates with the interchangeable lens 100 via a voltage conversion unit 23. The camera microcomputer 20 includes an LCLK_OUT terminal that outputs the communication clock signal, a DCL_OUT terminal that outputs communication data to the interchangeable lens 100, and a DLC_IN terminal that receives an input of the communication data from the interchangeable lens 100.

The camera microcomputer 20 includes an MIF_IN terminal for detecting the attachment of the interchangeable lens 100, a TYPE_IN terminal for identifying the type of the interchangeable lens 100, and a CNT_V_OUT terminal for outputting a communication voltage switching signal to the voltage conversion unit 23.

The camera microcomputer 20 further includes a CNT_VDD_OUT terminal that outputs an energization signal for the power switch 22, a connection terminal with the image processing unit 13, and a connection terminal with the operation unit 15.

The lens control unit 104 includes a microcomputer (referred to as a lens microcomputer hereinafter) 111, a lens-type determined unit 113, and a lens power supply unit 114.

The lens microcomputer 111 communicates with the camera microcomputer 20 via the voltage conversion unit 23. The lens microcomputer 111 includes an LCLK IN terminal that receives an input of the communication clock signal, a DLC OUT terminal that outputs the communication data to the camera 10, a DCL IN terminal that receives an input of the communication data from the camera 10, and a connection terminal with the aperture driving unit 105.

A description will be given of an attachment detection of the interchangeable lens 100 to the camera 10. Since the MIF_IN terminal of the camera microcomputer 20 is pulled up to the power supply by a resistance R (100KΩ), if no interchangeable lens (first and second interchangeable lenses) 100 is attached, a voltage value becomes H (High). Since the MIF_IN terminal is connected to GND in the interchangeable lens (first and second interchangeable lenses) 100 that has been attached, the voltage value becomes L (Low) regardless of the type of the interchangeable lens 100.

Figure 3:
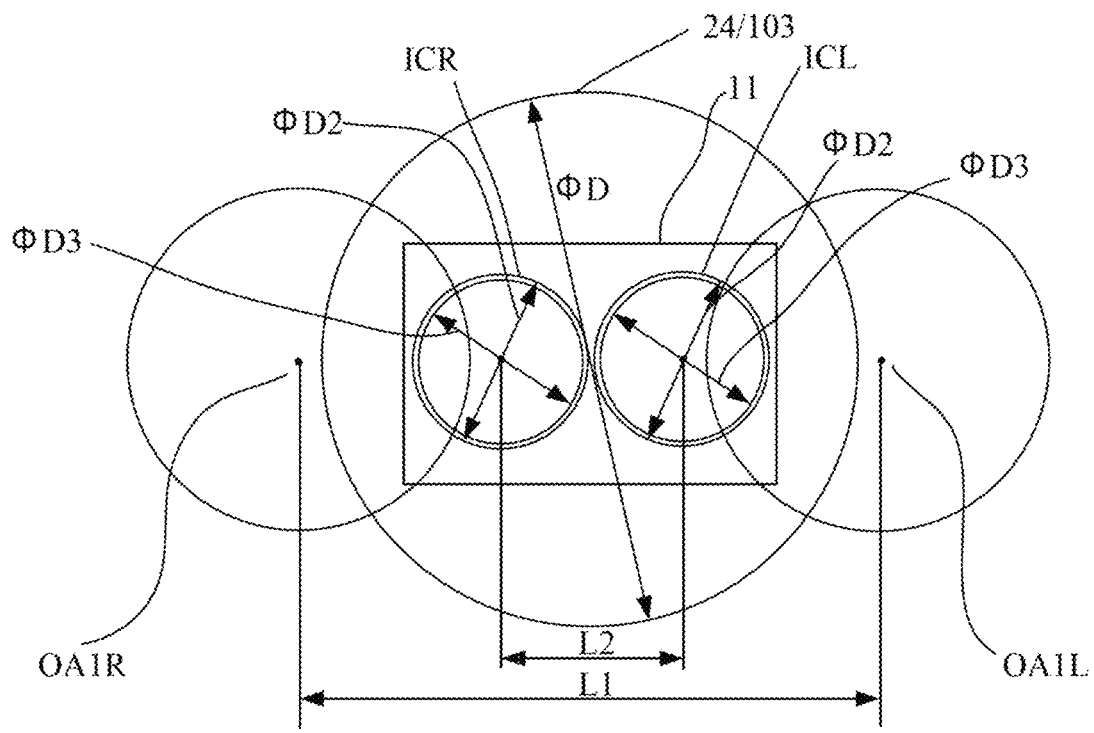
FIG. 3 illustrates a positional relationship among an optical-axis position of an interchangeable lens, a mount, and an image circle on an image sensor.

FIG. 3 illustrates a positional relationship among the position of each optical axis of the interchangeable lens 100, the mount, and the image circle (imaging area) on the image sensor 11.

A right-eye image circle ICR at an effective angle of view formed by the right-eye lens unit 101R and a left-eye image circle ICL at an effective angle of view formed by the left-eye lens unit 101L are imaged in parallel on the image sensor 11. A distance between the image circles may be set based on a diameter ΦD2 of each image circle so as to prevent or restrain the image circles from overlapping each other. For example, areas made by dividing a light receiving range of the image sensor 11 into left and right halves with respect to the center may be assumed, the center of the right-eye image circle ICR may be set to the center of the right area of the light receiving range, and the center of the left-eye image circle ICL may be set to the center of the left area of the light receiving range.

The optical system according to this embodiment is an all-around fisheye lens, and each image formed on an imaging plane is a circular image showing a range of an angle of view exceeding 180 degrees, and there are formed two, left and right, circular images as illustrated in FIG. 3.

Now assume that a first optical axis is an optical axis before light is reflected by the prism 106R or 106L, a second optical axis is an optical axis after light is reflected by the prism 106R or 106L, and a third optical axis is an optical axis after light is reflected by the prism 107R or 107L. A distance between a first optical axis OA1R of the right-eye lens unit 101R and a first optical axis OA1L of the left-eye lens unit 101L will be referred to as a baseline length L1. The longer the baseline length L1 is, the greater the three-dimensional effect becomes during viewing.

For example, assume that the image sensor 11 has a sensor size of 24 mm in length×36 mm in width, the image circle has a diameter of Φ17 mm, a distance L2 between the third optical axes is 18 mm, and the second optical axis has a length of 21 mm. In a case where the optical element is disposed so that the second optical axis extends in the horizontal direction (direction parallel to the imaging plane), the baseline length L1 becomes 60 mm, which is almost equal to the eye width of an adult. A diameter ΦD of the lens mount 103 may be shorter than the baseline length L1. By making the distance L2 between the third optical axes shorter than the diameter ΦD of the lens mount 103, the optical element disposed on the third optical axis can be disposed inside the lens mount 103. That is, a relationship of L1>ΦD>L2 is established.

In VR viewing, it is said that an angle of view that provides a three-dimensional effect is about 120 degrees, but since a sense of discomfort remains in the case of the field of view of 120 degrees, the angle of view is often widened up to 180 degrees. Since the effective angle of view exceeds 180 degrees in this embodiment, the diameter ΦD2 of the image circle in this embodiment is longer than the diameter ΦD3 of the image circle in case of the angle of view of 180 degrees. That is, a relationship of ΦD2>ΦD3 is established.

Figure 4A:
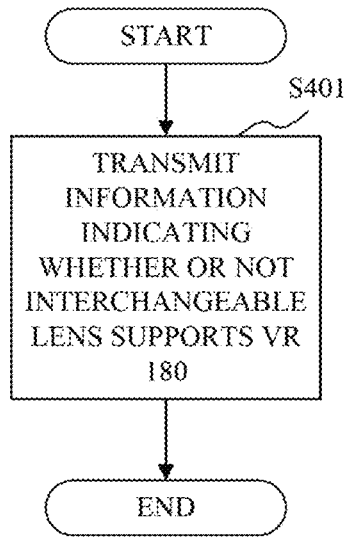
FIGS. 4A and 4B illustrate flows until a photometric area is set.
Figure 4B:
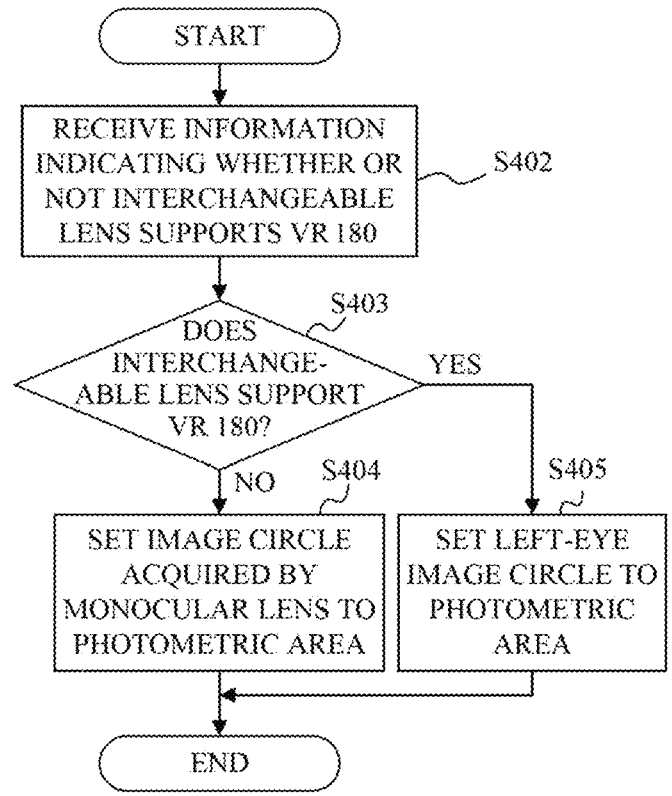

FIGS. 4A and 4B illustrate flows until the photometric area to be executed at startup is set. In a case where the camera 10 equipped with the interchangeable lens 100 supports (is compatible with) VR 180, which is a stereoscopic VR moving-image standard (predetermined stereoscopic image standard) at an angle of view of 180 degrees, and monaurally displays a stereoscopic image, the camera 10 is specified to display a left-eye image as a reference image. If there is a difference between the exposure of the right-eye image and the exposure of the left-eye image for some reason and a photometric area is provided to the right-eye image, the AE accuracy on the left eye side may decrease. The lens control unit 104 normally adjusts AE of the reference image that is used (displayed) in the case where the stereoscopic image captured by the camera 10 is monaurally displayed, and thus transmits to the camera 10 information for photometry in the left-eye image circle ICL illustrated in FIG. 3. Here, the stereoscopic image is an image acquired by the plurality of lens units.

FIG. 4A illustrates the flow of the lens control unit 104. In step S401, the lens control unit 104 transmits to the camera control unit 17 information (ID) indicating whether or not the interchangeable lens 100 supports VR 180 (information indicating setting the image circle of the first lens unit to the photometric area). In this embodiment, ID of 1 means that the interchangeable lens 100 supports VR 180, and ID of 0 means that the interchangeable lens 100 does not support VR 180.

FIG. 4B illustrates the flow of the camera control unit 17. In step S402, the camera control unit 17 receives information (ID) from the lens control unit 104 indicating whether or not the interchangeable lens 100 supports VR 180. In step S403, the camera control unit 17 determines whether or not the interchangeable lens 100 supports VR 180 (ID is 1). If it is determined that the interchangeable lens 100 supports VR 180 (ID is 1), the flow proceeds to step S405, and if it is determined that the interchangeable lens 100 does not support VR 180 (ID is 0), the flow proceeds to step S404. In step S404, the camera control unit 17 sets the image circle acquired by the monocular lens to the photometric area. In step S405, the camera control unit 17 sets the left-eye image circle ICL to the photometric area.

The above configuration makes proper the exposure of the reference image to be displayed in monaurally displaying a stereoscopic image captured by the image pickup apparatus.

Figure 5A:
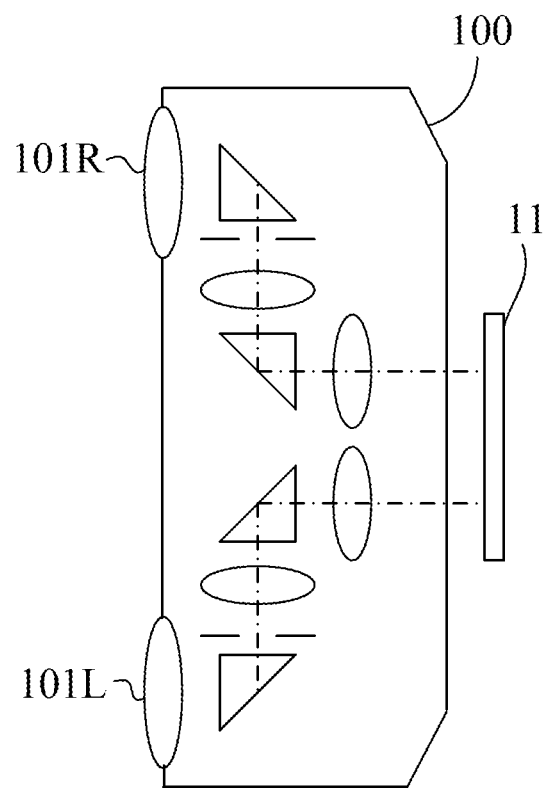
FIGS. 5A and 5B explain a single-eye focus correcting mechanism.
Figure 5B:
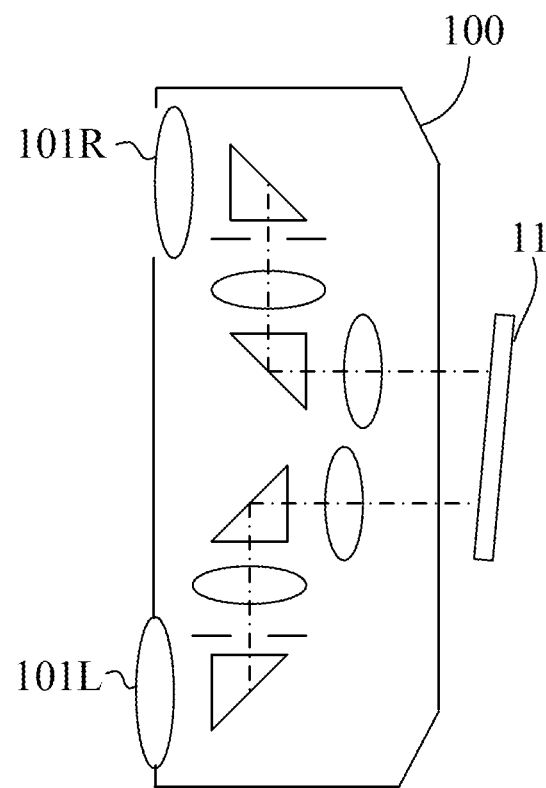

In the compound eye lens unit, a defocus may occur between the left eye and the right eye due to variations in the imaging plane tilt caused by individual camera differences and reliability changes (temperature, humidity, impact, etc.). For example, as illustrated in FIG. 5A, it is ideal that the imaging plane of the image sensor 11 is not tilted, but the imaging plane may be tilted as illustrated in FIG. 5B due to individual differences of the camera 10. In the state of FIG. 5B, even if focusing is attempted, the left and right optical systems move in the same manner, so that the left and right focusing cannot be realized at the same time.

In this embodiment, the right-eye lens unit 101R includes a single-eye focus correcting mechanism (correction mechanism) that adjusts the right-eye focus position to the left-eye focus position by rotating an eccentric roller connected to a screw by the user (reduces a difference between a focus position of a first lens unit and a focus position of a second lens unit). Thereby, only the right-eye lens unit 101R can be moved to the object side or the photographer side without moving the left-eye lens unit 101L.

However, in moving the right-eye focus position, a light amount may change due to the tilt of the optical axis. In the case where the right-eye image circle ICR is set to the photometric area and the light amount on the right eye side changes, the AE accuracy on the left eye side may decrease. Accordingly, this embodiment sets to the photometric area the image circle acquired by the lens unit that does not include the single-eye focus correcting mechanism.

Figures 6A, 6B:
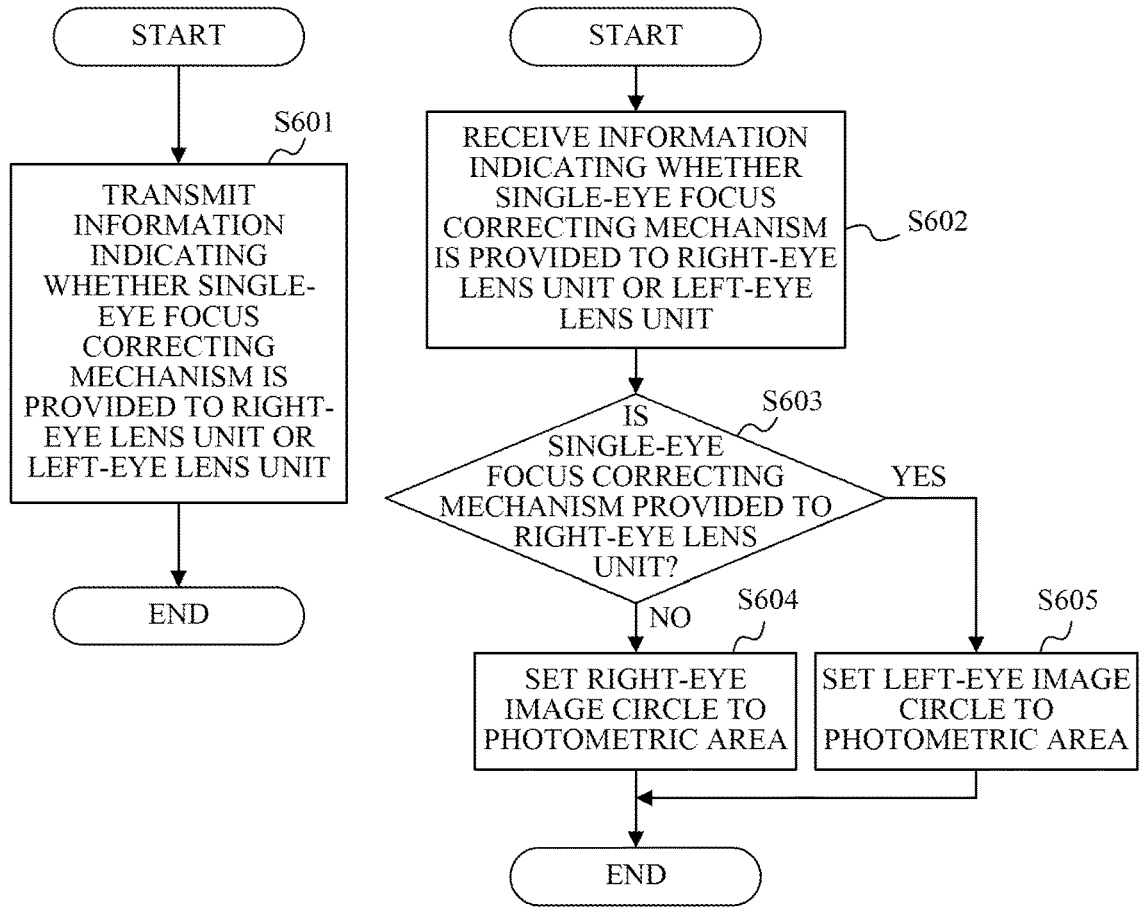
FIGS. 6A and 6B illustrate flows until the photometric area is set in the case where the single-eye focus correcting mechanism is provided.

FIGS. 6A and 6B illustrate flows until the photometric area is set in a case where the single-eye focus correcting mechanism executed at startup is provided.

FIG. 6A illustrates the flow of the lens control unit 104. In step S601, the lens control unit 104 transmits to the camera control unit 17 information (ONE_EYE_COR ID) indicating whether the single-eye focus correcting mechanism is provided to the right-eye lens unit 101R or the left-eye lens unit 101L. In this embodiment, ONE_EYE_COR ID of 1 means that the single-eye focus correcting mechanism is provided to the right-eye lens unit 101R. ONE_EYE_COR ID of 0 means that the single-eye focus correcting mechanism is provided to the left-eye lens unit 101L.

FIG. 6B illustrates the flow of the camera control unit 17. In step S602, the camera control unit 17 receives from the lens control unit 104 information (ONE_EYE_COR ID) indicating whether the single-eye focus correcting mechanism is provided to the right-eye lens unit 101R or the left-eye lens unit 101L. In step S603, the camera control unit 17 determines whether or not the single-eye focus correcting mechanism is provided to the right-eye lens unit 101R (ONE_EYE_COR ID is 1). If it is determined that the single-eye focus correcting mechanism is provided to the right-eye lens unit 101R (ONE_EYE_COR ID is 1), the flow proceeds to step S605, and if not (ONE_EYE_COR ID is 0), the flow proceeds to step S604. In step S604, the camera control unit 17 sets the right-eye image circle ICL to the photometric area. In step S605, the camera control unit 17 sets the left-eye image circle ICL to the photometric area.

Thus, even if the light amount changes due to the single-eye focus correcting mechanism, the above configuration can make proper the exposure of the reference image to be displayed in monaurally displaying a stereoscopic image captured by the image pickup apparatus.

Figure 7:
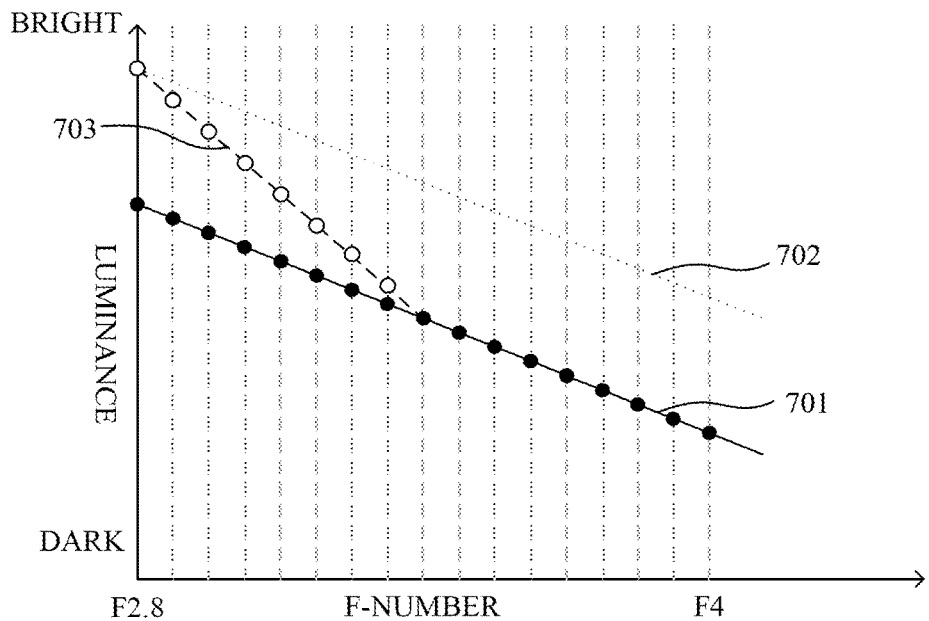
FIG. 7 illustrates a relationship between luminance and an F-number of an interchangeable lens.

FIG. 7 illustrates a relationship between the F-number of the interchangeable lens 100 and the luminance. Reference numeral 701 denotes a relationship between the F-number and the luminance of the left-eye lens unit 101L. Reference numeral 702 denotes a relationship between the F-number and the luminance of the right-eye lens unit 101R before the single-eye aperture correction corrects the luminance of either the right-eye image circle ICR or the left-eye image circle ICL. Reference numeral 703 denotes a relationship between the F-number of the right-eye lens unit 101R and the luminance after the single-eye aperture correction corrects the luminance.

In the interchangeable lens 100, the aperture diameter accuracies of the left and right eyes may vary due to individual variations of the aperture units. In the case where the aperture diameter accuracies vary, as illustrated in 701 and 702 of FIG. 7, the single-eye aperture correction is necessary so as to eliminate a difference in luminance between the left-eye image circle and the right-eye image circle. However, in order to comply with the Camera and Imaging Products Association (CIPA) standard, the aperture diameter accuracy in the open state is adjusted while the F-number is prioritized and thus, as illustrated in 703 of FIG. 7, a state that is narrower by one stage than the open state or a light amount change from the narrowed state to the open state may be distorted on the right-eye side. In the case where the right-eye image circle ICR is set to the photometric area and the single-eye aperture correction is made, the AE accuracy on the left eye side may decrease. Accordingly, this embodiment performs the single-eye aperture correction in the lens unit that is not used in monaurally displaying the stereoscopic image captured by the image pickup apparatus.

Figure 8A:
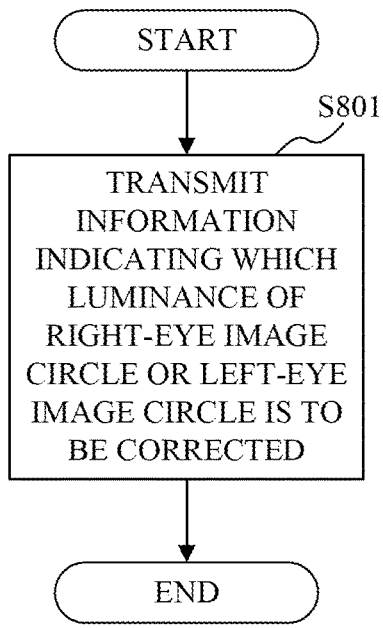
FIGS. 8A and 8B illustrate flows until the photometric area is set in a case where single-eye aperture correction is executed.
Figure 8B:
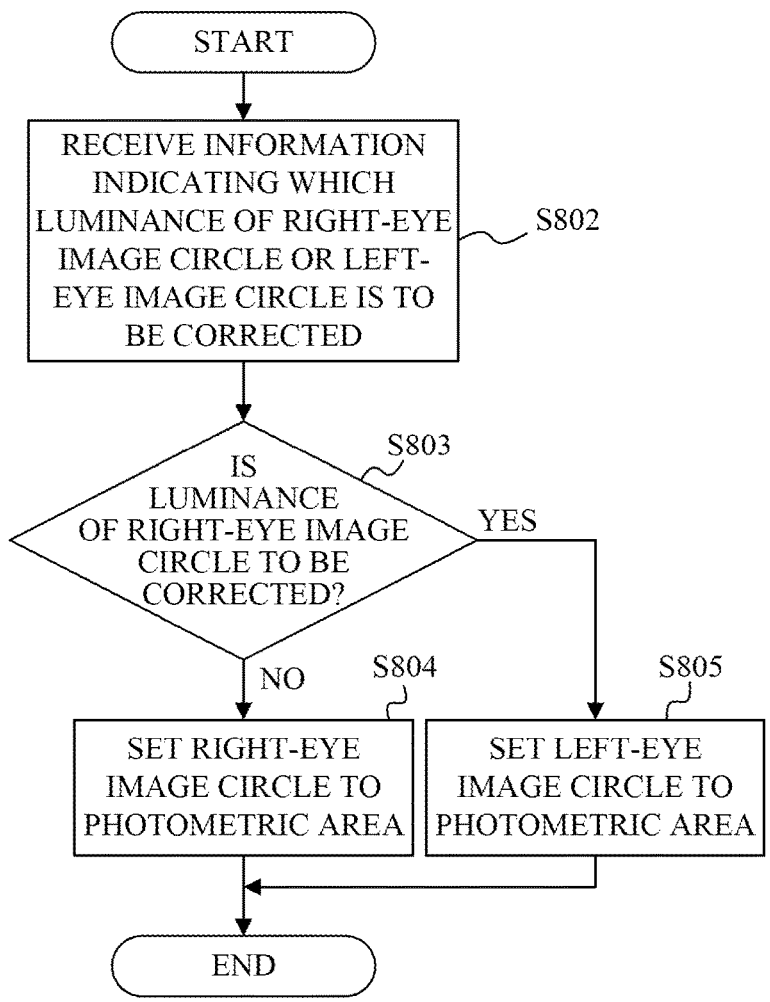

FIGS. 8A and 8B illustrate flows until the photometric area is set in the case where the single-eye aperture correction is executed.

FIG. 8A illustrates the flow of the lens control unit 104. In step S801, the lens control unit 104 transmits to the camera control unit 17 information (ONE_EYE_APE ID) indicating which luminance of the right-eye image circle ICR or the left-eye image circle ICL is to be corrected. In this embodiment, ONE_EYE_APE ID of 1 means that the luminance of the right-eye image circle ICR is to be corrected. ONE_EYE_APE ID of 0 means that the luminance of the left-eye image circle ICL is to be corrected.

FIG. 8B illustrates the flow of the camera control unit 17. In step S602, the camera control unit 17 receives from the lens control unit 104 information (ONE_EYE_APE ID) indicating which luminance of the right-eye image circle ICR or the left-eye image circle ICL is to be corrected. In step S803, the camera control unit 17 determines whether or not the luminance of the right-eye image circle ICR is to be corrected (ONE_EYE_APE ID is 1). If it is determined that the luminance of the right-eye image circle ICR is to be corrected (ONE_EYE_APE ID is 1), the flow proceeds to step S805, and if not (ONE_EYE_APE ID is 0), the flow proceeds to step S804. In step S804, the camera control unit 17 sets the right-eye image circle ICR to the photometric area. In step S805, the camera control unit 17 sets the left-eye image circle ICL to the photometric area.

Thus, even if the single-eye aperture correction is executed, the above configuration can make proper the exposure of the reference image to be displayed in monaurally displaying a stereoscopic image captured by the image pickup apparatus.

The interchangeable lens 100 includes the aperture unit 102L in a normal orientation on the left eye side and the aperture unit 102R in an upside-down orientation on the right eye side. The aperture units have a difference in aperture diameter accuracy due to the difference in orientation in the pitch direction. If a photometric area is provided to the image circle acquired by the lens unit provided with the aperture unit that includes low aperture diameter accuracy, the AE accuracy may decrease. Accordingly, in this embodiment, the lens control unit 104 transmits to the camera 10 information (PHO ID) indicating which image circle is set to the photometric area by the camera control unit 17 according to the orientation of the interchangeable lens 100.

Figure 9A:
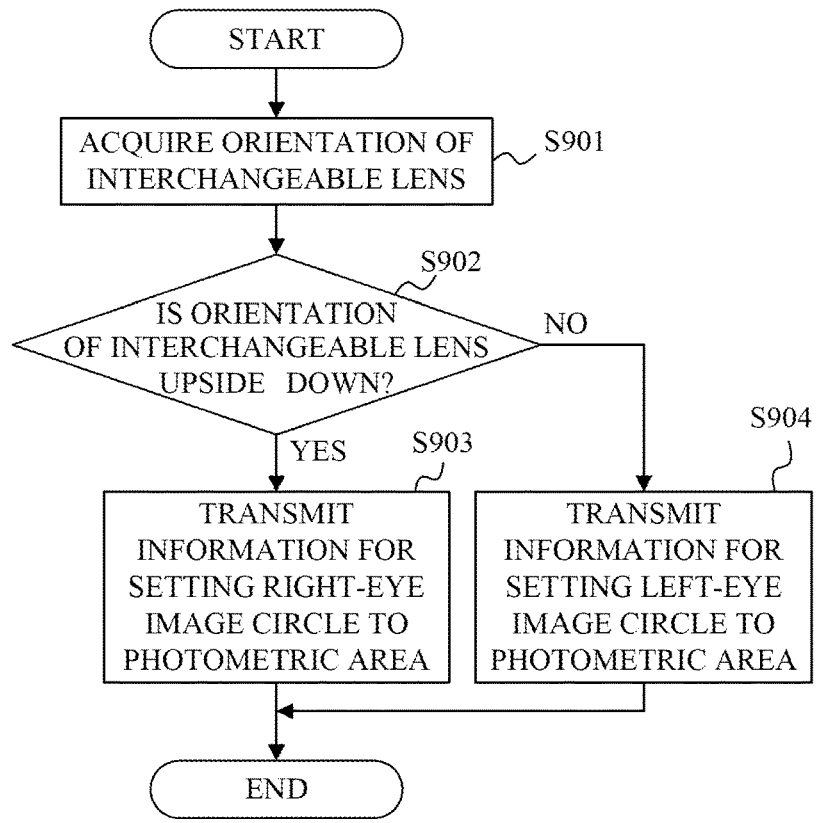
FIGS. 9A and 9B illustrate flows until the photometric area for each orientation is set.
Figure 9B:
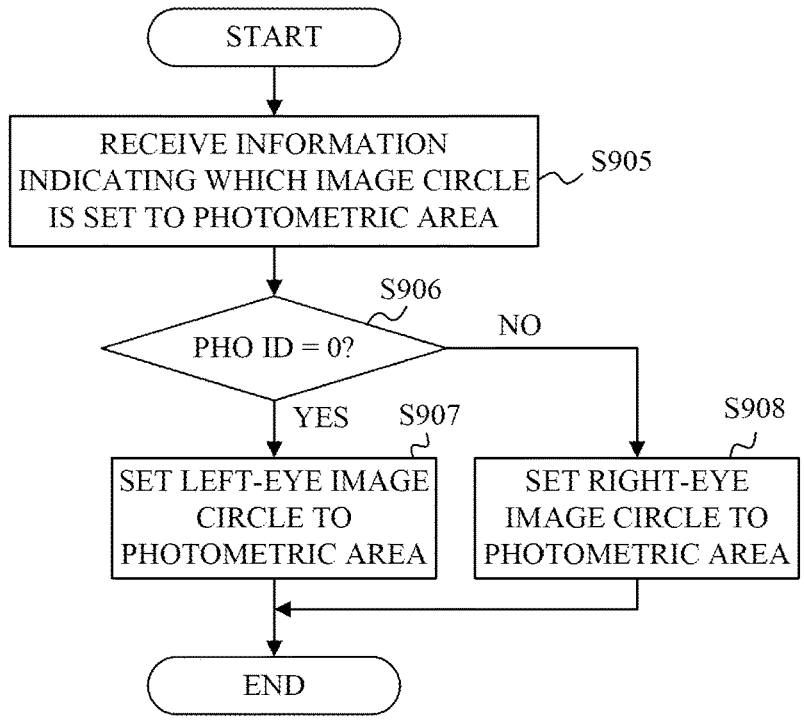

FIGS. 9A and 9B illustrate flows until the photometric area for each orientation is set.

FIG. 9A illustrates the flow of the lens control unit 104. In step S901, the lens control unit 104 acquires the orientation of the interchangeable lens 100 detected by an acceleration sensor or the like. In step S902, the lens control unit 104 determines whether or not the orientation of the interchangeable lens 100 is the upside-down orientation. If it is determined that the orientation is upside down, the flow proceeds to step S903, and if not, the flow proceeds to step S904. In step S903, the lens control unit 104 transmits to the camera control unit 17 information (information in which the PHO ID is 1) for setting the right-eye image circle ICR to the photometric area. In step S904, the lens control unit 104 transmits to the camera control unit 17 information (information in which the PHO ID is 0) for setting the left-eye image circle ICL to the photometric area.

FIG. 9B illustrates the flow of the camera control unit 17. In step S905, the camera control unit 17 receives from the lens control unit 104 information (PHO ID) indicating which image circle is set to the photometric area. In step S906, the camera control unit 17 determines whether or not the information (PHO ID) indicating which image circle is to be set to the photometric area is 0. If it is determined that the information (PHO ID) indicating which image circle is to be set in the photometric area is 0, the flow proceeds to step S907, and if not, the flow proceeds to step S908. In step S907, the camera control unit 17 sets the left-eye image circle ICL to the photometric area. In step S908, the camera control unit 17 sets the right-eye image circle ICR to the photometric area.

The above configuration can make proper the exposure of the reference image to be displayed in monaurally displaying the stereoscopic image captured by the image pickup apparatus according to the orientation of the interchangeable lens 100.

The above embodiment can provide an interchangeable lens that can make proper the exposure of the reference image to be displayed in monaurally displaying the stereoscopic image.

Other Embodiments

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-149728, filed on Sep. 14, 2021, which is hereby incorporated by reference herein in its entirety.

What is claimed is:

1. An interchangeable lens attachable to and detachable from an image pickup apparatus that includes a single image sensor, the interchangeable lens comprising:
    a stereoscopic lens unit that includes a first lens unit and a second lens unit, the second lens unit including a correction mechanism configured to reduce a difference between a focus position of the first lens unit and a focus position of the second lens unit, the first lens unit not including the correction mechanism;
    a control unit configured to generate information for setting a first imaging area acquired by the first lens unit, which does not include the correction mechanism, as a photometric area for performing auto exposure adjustment for both the first lens unit and the second lens unit, the first imaging area not including a second imaging area acquired by the second lens unit that includes the correction mechanism; and
    a communication unit configured to transmit, to the image pickup apparatus, the generated information to be used in monaurally displaying an image acquired by the first lens unit and the second lens unit.

2. The interchangeable lens according to claim 1, wherein a luminance of the second imaging area is corrected so as to reduce a difference from a luminance of the first imaging area.

3. The interchangeable lens according to claim 2, wherein the second lens unit includes an aperture unit configured to change a luminance of an image acquired by the second lens unit.

4. An interchangeable lens attachable to and detachable from an image pickup apparatus that includes a single image sensor, the interchangeable lens comprising:
    a stereoscopic lens unit that includes a left-eye lens unit and a right-eye lens unit, wherein one lens unit of the left-eye lens unit and the right-eye lens unit includes a correction mechanism configured to reduce a difference between a focus position of the left-eye lens unit and a focus position of the right-eye lens unit, and the other lens unit does not include the correction mechanism;
    a control unit configured to generate information for setting, in a case where the orientation of the interchangeable lens is an upside-down orientation, only a first imaging area acquired by the one lens unit, which includes the correction mechanism, to a photometric area for performing auto exposure for both the left-eye lens unit and the right-eye lens unit, and, in a case where the orientation of the interchangeable lens is not the upside-down orientation, only a second imaging area acquired by the other lens unit, which does not include the correction mechanism, to the photometric area for performing auto exposure for both the left-eye lens unit and the right-eye lens unit; and
    a communication unit configured to transmit, to the image pickup apparatus, the generated information for setting the photometric area for performing auto exposure for both the left-eye lens unit and the right-eye lens unit.

5. An image pickup apparatus to which an interchangeable lens including a stereoscopic lens unit is detachably attached, the stereoscopic lens unit including a left-eye lens unit and a right-eye lens unit, one lens unit of the left-eye lens unit and the right-eye lens unit including a correction mechanism configured to reduce a difference between a focus position of the left-eye lens unit and a focus position of the right-eye lens unit, the other lens unit not including the correction mechanism, the image pickup apparatus comprising:

- a single image sensor; and
- a setting unit configured to set a photometric area by:
  - in a case where the interchangeable lens supports a virtual reality (VR) moving image standard, setting only a first imaging area acquired by the other lens unit, that does not include the correction mechanism and is used in monaurally displaying an image, to the photometric area for performing auto exposure adjustment for both the left-eye lens unit and the right-eye lens unit; and
  - in a case where the interchangeable lens does not support the VR moving image standard, setting a second imaging area acquired by a monocular lens unit to the photometric area for performing auto exposure adjustment for both the left-eye lens unit and the right-eye lens unit.

6. The image pickup apparatus according to claim 5, further comprising a photometry unit configured to perform photometry.

* * * * *